(12) United States Patent
Fei et al.

(10) Patent No.: US 12,228,732 B2
(45) Date of Patent: Feb. 18, 2025

(54) IMAGE DISPLAY METHOD AND IMAGE DISPLAY APPARATUS

(71) Applicant: HUAWEI TECHNOLOGIES CO., LTD., Guangdong (CN)

(72) Inventors: Yonghao Fei, Munich (DE); Shihong Ouyang, Shenzhen (CN); Antonie Verhoeven, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 13 days.

(21) Appl. No.: 18/187,728

(22) Filed: Mar. 22, 2023

(65) Prior Publication Data

US 2023/0221554 A1    Jul. 13, 2023

Related U.S. Application Data

(63) Continuation of application No. PCT/CN2020/117141, filed on Sep. 23, 2020.

(51) Int. Cl.
G02B 27/01 (2006.01)
G02B 27/42 (2006.01)

(52) U.S. Cl.
CPC ..... *G02B 27/0101* (2013.01); *G02B 27/4244* (2013.01); *G02B 2027/0118* (2013.01); *G02B 2027/014* (2013.01)

(58) Field of Classification Search
None
See application file for complete search history.

(56) References Cited

U.S. PATENT DOCUMENTS

| 9,417,453 | B2 | 8/2016 | Amitai |
| 10,838,132 | B1* | 11/2020 | Calafiore ............. G02B 6/0015 |
| 2014/0211322 | A1 | 7/2014 | Bohn et al. |
| 2016/0231568 | A1 | 8/2016 | Saarikko et al. |
| 2017/0235219 | A1 | 8/2017 | Kostamo |
| 2017/0357089 | A1 | 12/2017 | Tervo et al. |
| 2023/0290290 | A1* | 9/2023 | Shams ................. G09G 3/2003 |

FOREIGN PATENT DOCUMENTS

| CN | 107340567 A | 11/2017 |
| CN | 107870438 A | 4/2018 |
| CN | 110426849 A | 11/2019 |

(Continued)

OTHER PUBLICATIONS

International Search Report and Written Opinion issued in PCT Application No. PCT/CN2020/117141 dated Jun. 21, 2021.

*Primary Examiner* — Ifedayo B Iluyomade (57) ABSTRACT

This application provides an image display method and an image display apparatus, and is beneficial to improving uniformity of an image displayed by using a diffractive waveguide, thereby improving user experience. The method is applied to an apparatus including an optical engine and the diffractive waveguide and includes: obtaining uniformity data of a first image obtained by using the diffractive waveguide; determining to-be-compensated data of the optical engine based on the uniformity data; adjusting luminance distribution of a light source in the optical engine based on the to-be-compensated data; and displaying a second image by using the adjusted optical engine and the diffractive waveguide.

13 Claims, 5 Drawing Sheets

Eye box

| Region 1 | Region 2 | Region 3 | Region 4 | Region 5 |
|---|---|---|---|---|
| D | C | B | C | D |
| Region 6 | Region 7 | Region 8 | Region 9 | Region 10 |
| C | B | A | B | C |
| Region 11 | Region 12 | Region 13 | Region 14 | Region 15 |
| D | C | B | C | D |

(56) References Cited

FOREIGN PATENT DOCUMENTS

| CN | 110543022 A | 12/2019 |
|----|-------------|---------|
| CN | 110764260 A | 2/2020 |
| CN | 111487774 A | 8/2020 |
| WO | 2018039277 A9 | 3/2018 |
| WO | 2019185973 A1 | 10/2019 |

* cited by examiner

Test uniformity of a first image that is corresponding to a plurality of regions, to obtain a plurality of pieces of uniformity sub-data ~ S401

Determine uniformity data of the first image based on the plurality of pieces of uniformity sub-data and weights of the plurality of regions ~ S402

FIG. 4

Eye box

| Region 1 | Region 2 | Region 3 | Region 4 | Region 5 |
|---|---|---|---|---|
| D | C | B | C | D |
| Region 6 | Region 7 | Region 8 | Region 9 | Region 10 |
| C | B | A | B | C |
| Region 11 | Region 12 | Region 13 | Region 14 | Region 15 |
| D | C | B | C | D |

Determine a target region based on eye tracking technology  ～ S601

Obtain uniformity sub-data of a first image that is corresponding to the target region  ～ S602

Determine the uniformity sub-data of the first image that is corresponding to the target region as uniformity data of the first image  ～ S603

IMAGE DISPLAY METHOD AND IMAGE DISPLAY APPARATUS

CROSS-REFERENCE TO RELATED APPLICATIONS

This application is a continuation of International Application No. PCT/CN2020/117141, filed on Sep. 23, 2020, the disclosure of which is hereby incorporated by reference in its entirety.

TECHNICAL FIELD

This application relates to the field of augmented reality, and in particular, to an image display method and an image display apparatus.

BACKGROUND

An augmented reality (augmented reality, AR) technology can combine a virtual environment and a real environment, and superimpose an object in a real environment and an object in a virtual environment into a same picture in real time to display, to implement interaction between the real environment and the virtual environment. An AR head-mounted display device is a wearable device that implements the AR technology and can be worn on a human head for display. The AR head-mounted display device is usually implemented in a form of a pair of glasses or a helmet. The AR head-mounted display device can display a picture in front of eyes of a user to enhance a reality sense of the user.

A display part of the AR head-mounted display device includes an optical engine and a diffractive waveguide. The optical engine includes a light source, a lens group, a display screen, a lens, and another device. For example, the light source may include a light emitting diode (light emitting diode, LED), or may include a laser diode (laser diode, LD); and the display screen may include a liquid crystal on silicon (liquid crystal on silicon, LCOS) display screen, or may include a digital light processing (digital light procession, DLP) display screen. A principle of the display part is as follows: Light emitted by the light source can be transmitted to the display screen through the lens group for imaging, an image imaged by the display screen can be used as an image source, and the light emitted by the light source can be modulated through the lens to reach an exit pupil and then enter the diffractive waveguide, and finally pupil expansion is performed by using the diffractive waveguide to display a virtual image. Therefore, the virtual image displayed by the display part of the AR head-mounted display device enters a human eye, to implement near-eye display.

A core component of the diffractive waveguide is a diffraction grating. The diffraction grating can divide incident light into several diffractive orders of light and perform dispersion. Incident light of different colors has different wavelengths and different diffraction angles. Therefore, when the incident light of different colors is transmitted in the diffractive waveguide, transmission angles and paths are different, and consequently, uniformity of the image is poor, affecting user experience.

SUMMARY

This application provides an image display method and an image display apparatus, and is beneficial to improving uniformity of an image displayed by using a diffractive waveguide, thereby improving user experience.

According to a first aspect, an image display method is provided. The method is applied to an apparatus including an optical engine and a diffractive waveguide. The method includes: obtaining uniformity data of a first image obtained by using the diffractive waveguide; determining to-be-compensated data of the optical engine based on the uniformity data; adjusting luminance distribution of a light source in the optical engine based on the to-be-compensated data; and displaying a second image by using the adjusted optical engine and the diffractive waveguide.

In the image display method in this embodiment of this application, the luminance distribution of the light source in the optical engine is adjusted, to compensate for luminance of an image displayed by the diffractive waveguide, and therefore uniformity of the image displayed by the diffractive waveguide is improved, thereby improving user experience.

Because the light source may include an LED array light source, or may include an LD light source, in this embodiment, luminance distribution of the LED array light source may be adjusted, or luminance distribution of the LD light source may be adjusted.

It should be understood that, in this embodiment of this application, image uniformity includes luminance uniformity of an image and color uniformity of an image. Luminance and a color are associated, and the color changes with the luminance. Therefore, in this embodiment of this application, the luminance distribution of the light source in the optical engine is adjusted, to actually adjust luminance uniformity and color uniformity of an image presented by the optical engine, so that uniformity of the image output by the optical engine and uniformity of the image output by the diffractive waveguide are complementary. Finally, a high-uniformity image is presented.

With reference to the first aspect, in some implementations of the first aspect, the obtaining uniformity data of a first image obtained by using the diffractive waveguide includes: testing uniformity of the first image that is corresponding to a plurality of regions, to obtain a plurality of pieces of uniformity sub-data; and determining the uniformity data based on the plurality of pieces of uniformity sub-data and weights of the plurality of regions.

In the image display method in this embodiment of this application, through region division, the uniformity data of the first image may be determined based on the uniformity sub-data corresponding to the plurality of divided regions and the weights of the plurality of regions, to determine the to-be-compensated data based on the uniformity data, further the luminance distribution of the light source in the optical engine is adjusted, and the second image is displayed by using the optical engine and the diffractive waveguide. In the method in this embodiment of this application, all regions in which a human eye may be located can be considered, so that uniformity of images displayed in different regions gazed by different users or in different regions gazed by a same user at different moments is improved, thereby improving user experience.

A human eye can move, the human eye of a same user may be located in different positions of an eye box eye box at different moments, and human eyes of different users may also be located in different positions of the eye box relative to a same device. Therefore, the plurality of regions in this embodiment of this application may include regions obtained by dividing the eye box. In different regions, the human eye may see first images of different uniformity degrees. In this embodiment of this application, uniformity sub-data is used to indicate uniformity degrees of first images in different regions.

In this embodiment of this application, the plurality of regions have respective weights, weights of some regions may be the same, and weights of some regions may be different. This is not limited in this embodiment of this application. Optionally, the uniformity data of the first image may be obtained by performing weighted summation on uniformity sub-data corresponding to the plurality of regions.

In a possible implementation, considering that a proportion of people corresponding to an intermediate region is relatively high, and a proportion of people corresponding to an edge region is relatively low, an intermediate region of the plurality of regions has a highest weight, and an edge region of the plurality of regions has a lowest weight. In this way, this is more consistent with an actual situation and is beneficial to obtaining more accurate uniformity data.

With reference to the first aspect, in some implementations of the first aspect, before the obtaining uniformity data of a first image obtained by using the diffractive waveguide, the method further includes: determining a target region based on an eye tracking technology; and the obtaining uniformity data of a first image obtained by using the diffractive waveguide includes: obtaining uniformity sub-data of the first image that is corresponding to the target region; and determining the uniformity sub-data of the first image that is corresponding to the target region as the uniformity data.

In the image display method in this embodiment of this application, a human eye position is tracked in real time by using the eye tracking technology, the uniformity data of the first image is obtained based on the human eye position, then the luminance distribution of the light source in the optical engine is adjusted in real time, and the second image is displayed by using the optical engine and the diffractive waveguide. In the method in this embodiment of this application, different users may be flexibly adapted, and uniformity of an image of a target region that is corresponding to an eyeball position of a current user is determined based on the eyeball position of the current user, to perform compensation based on the uniformity of the image of the target region, to provide good experience for the user.

With reference to the first aspect, in some implementations of the first aspect, the obtaining uniformity sub-data of the first image that is corresponding to the target region includes: selecting, from a plurality of pieces of uniformity sub-data of the first image that are corresponding to a plurality of regions, the uniformity sub-data of the first image that is corresponding to the target region, where the plurality of regions include the target region.

Before determining the target region, an image display device has tested the uniformity of the first image that is corresponding to the plurality of regions, obtained the plurality of pieces of uniformity sub-data, and stored the plurality of pieces of uniformity sub-data. In this case, after the image display device determines the target region, uniformity sub-data corresponding to the target region may be directly selected from the plurality of pieces of uniformity sub-data corresponding to the plurality of regions, to shorten an image display delay and improve image display efficiency.

With reference to the first aspect, in some implementations of the first aspect, before the determining to-be-compensated data of the optical engine based on the uniformity data, the method further includes: obtaining a luminance value of an environment in which the apparatus is located; and the determining to-be-compensated data of the optical engine based on the uniformity data includes: determining the to-be-compensated data based on the uniformity data and the luminance value.

With reference to the first aspect, in some implementations of the first aspect, the adjusting luminance distribution of a light source in the optical engine based on the to-be-compensated data includes: determining a target current value based on the to-be-compensated data; and adjusting the luminance distribution of the light source based on the target current value.

It should be understood that, because a larger current value indicates a brighter light source, and a smaller current value indicates a darker light source, in this embodiment of this application, the luminance distribution of the light source in the optical engine can be adjusted based on the target current value determined by the to-be-compensated data.

For example, if the light source is an LED array light source, and different LEDs in the LED array light source have different luminance, the image display device can first determine a relationship between different luminance and current values, then determine luminance required by each LED in the LED array, and convert the luminance required by each LED into a current value required by each LED, namely, the target current value.

According to a second aspect, an image display apparatus is provided. The image display apparatus is configured to perform the method in any possible implementation of the first aspect. Specifically, the apparatus includes units configured to perform the method according to any one of the possible implementations of either of the foregoing aspects.

According to a third aspect, another image display apparatus is provided, including a processor. The processor is coupled to a memory, and may be configured to execute instructions in the memory, to implement the method in any possible implementation of the first aspect. Optionally, the apparatus further includes the memory. Optionally, the apparatus further includes a communication interface, and the processor is coupled to the communication interface.

In an implementation, the image display apparatus is an AR head-mounted display device. When the image display apparatus is an AR head-mounted display device, the communication interface may be a transceiver or an input/output interface.

In another implementation, the image display apparatus is a chip configured in the AR head-mounted display device. When the image display apparatus is the chip configured in the AR head-mounted display device, the communication interface may be the input/output interface.

According to a fourth aspect, a processor is provided. The processor includes an input circuit, an output circuit, and a processing circuit. The processing circuit is configured to receive a signal by using the input circuit and transmit a signal by using the output circuit, so that the processor performs the method in any possible implementation of the first aspect.

In a specific implementation process, the processor may be a chip, the input circuit may be an input pin, the output circuit may be an output pin, and the processing circuit may be a transistor, a gate circuit, a trigger, various logic circuits, and the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and various circuits are not limited in this embodiment of this application.

According to a fifth aspect, a processing apparatus is provided. The processing apparatus includes a processor and a memory. The processor is configured to: read instructions stored in the memory, receive a signal by using a receiver, and transmit a signal by using a transmitter, to perform the method according to any one of the possible implementations of the first aspect.

Optionally, there are one or more processors, and there are one or more memories.

Optionally, the memory may be integrated with the processor, or the memory and the processor may be separately disposed.

In a specific implementation process, the memory may be a non-transitory (non-transitory) memory, for example, a read only memory (read only memory, ROM). The memory and the processor may be integrated into a same chip, or may be disposed on different chips. A type of the memory and a manner of disposing the memory and the processor are not limited in this embodiment of this application.

It should be understood that, a related data exchange process, for example, sending indication information may be a process of outputting indication information from the processor, and receiving capability information may be a process of receiving the input capability information by the processor. Specifically, data output by the processor may be output to the transmitter, and input data received by the processor may be from the receiver. The transmitter and the receiver may be collectively referred to as a transceiver.

The processing apparatus according to the fifth aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

According to a sixth aspect, a computer program product is provided. The computer program product includes a computer program (which may also be referred to as code or instructions). When the computer program is run, a computer is enabled to perform the method according to any one of the possible implementations of the first aspect.

According to a seventh aspect, a computer readable medium is provided. The computer readable medium stores a computer program (which may also be referred to as code or instructions). When the computer program is run on a computer, the computer is enabled to perform the method according to any one of the possible implementations of the first aspect.

DESCRIPTION OF EMBODIMENTS

The following describes technical solutions of this application with reference to accompanying drawings.

For ease of understanding, related terms in embodiments of this application are described first.

1. Diffractive Waveguide (Diffractive Waveguide)

An optical waveguide is a material for guiding a light wave to propagate therein, and is also referred to as a material optical waveguide.

The diffractive waveguide is an optical waveguide including a diffraction grating. Transmission of an imaging beam can be implemented by using a diffraction characteristic of light and a total reflection characteristic of an optical waveguide material. The diffractive waveguide mainly includes two types: a surface relief grating waveguide fabricated by using a photolithography and a holographic volume grating waveguide fabricated based on a holographic interferometry.

The diffraction grating is a core component of the diffractive waveguide. The diffraction grating is an optical component with a periodic structure. The period may be a peak and a valley embossed on a surface of a material or "light and dark interference fringes" formed due to exposure inside the material in a holographic technology. A function of the diffraction grating is to cause a periodic change of a refractive index in the material. This period is generally at a micro-nano level in a same order of magnitude of a visible wavelength (400 nm to 700 nm). Therefore the diffraction grating can have an effective effect on light.

2. Optical Engine

The optical engine may include a light source, a lens group, a display screen, a lens, and another device. Light emitted by the light source may be transmitted to the display screen for imaging through the lens group, and an image imaged the display screen may be used as an image source, that is, the display screen is an image surface of the light source. Because the display screen is the image surface of the light source, luminance distribution of the image imaged by the display screen one-to-one corresponds to luminance distribution of the light source.

The light source may include an LED light source, an LD light source, or another type of light source. The display screen may include an LCOS display screen, a DLP display screen, or another type of display screen. This is not limited in this application.

Taking the LED light source as an example, the LED light source may include a plurality of LEDs, namely, one LED array, and therefore, the LED light source may also be referred to as an LED array light source. The LED array may be of any size, for example, a 5×8 rectangle or a 5×5 square. This is not limited in this application. The LED array may be located on an LED substrate. The LED array and the LED substrate together form an LED module. The LED module may further include a diffuser (diffuser) and a brightness enhancement film (brightness enhancement film, BEF), to reduce a divergence angle of the LED array.

3. Image Display

Image display can be implemented by using an optical engine and a diffractive waveguide. Specifically, light emitted by a light source can be transmitted to a display screen through a lens group for imaging, modulated through the lens to reach an exit pupil, input into the diffractive waveguide, transmitted to a diffraction grating through diffraction and total reflection to generate pupil expansion, and finally output out of the diffractive waveguide to display an image.

Simply, a function of the optical engine may be understood as a projector, and a function of the diffractive waveguide may be understood as being responsible for transmitting an image of the projector into a human eye. It should be understood that, when the diffractive waveguide transmits the image, processing such as zoom in/out is not performed on the image.

4. Uniformity of an Image

Uniformity of an image refers to a degree of difference between pixels of an image in different positions on a display screen. Uniformity can be measured by using parameters such as luminance and a color. The luminance is also known as brightness, and indicates brightness of the color. The luminance and the color are associated to some extent, and the color changes with the luminance.

5. Eye Box (Eye Box)

The eye box is described for an AR head-mounted display device and refers to a tapered region between a display part of the AR head-mounted display device and an eyeball. The eye box is also a region in which display content is the clearest. Beyond the region, there may be problems such as a color rendering error, incomplete display content, and even no display content.

6. Eye Tracking (Eye Tracking) Technology

The eye tracking technology can track a human eye movement trajectory by measuring a position of a human eye gaze point or movement of a human eye relative to a head. Specifically, an image processing technology may be used to locate a position of a pupil, obtain a central coordinate of the pupil, and calculate the human eye gaze point by using an algorithm, to track the human eye movement trajectory.

For example, a pupil center corneal reflection tracking method may be used. An eye image is captured by an eye camera, image processing is performed to obtain a central position of the pupil, and then a cornea reflection point is used as a base point of a relative position of the eye camera and the human eye. A vector coordinate of a sight line of the human eye can be obtained based on the central position of the pupil obtained by image processing, to determine the human eye gaze point and then track the human eye movement trajectory.

Figure 1:
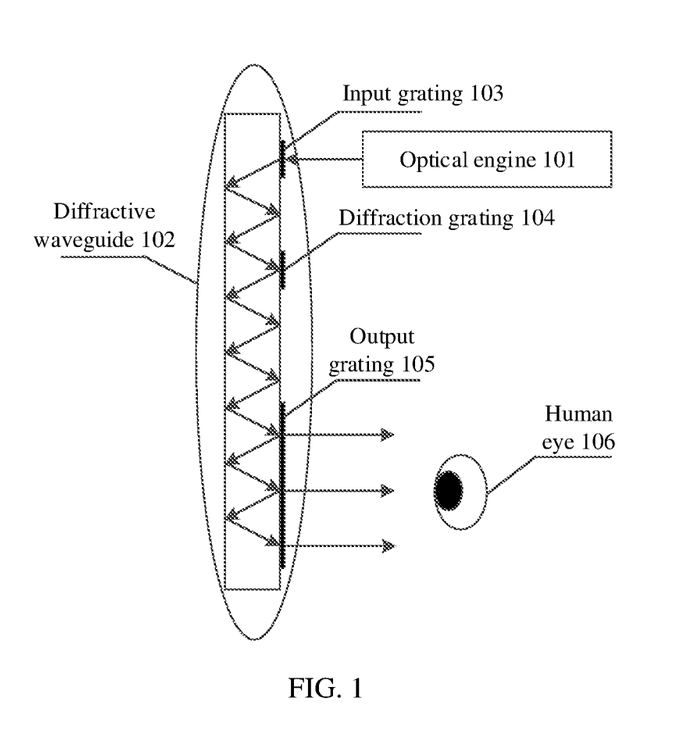
FIG. 1 is a schematic diagram of an image display principle.

FIG. 1 is a schematic diagram of an image display principle. FIG. 1 includes an optical engine 101, a diffractive waveguide 102 and a human eye 106. The diffractive waveguide 102 includes an input grating 103, a diffraction grating 104, and an output grating 105.

Light emitted from a light source in the optical engine 101 is imaged by using a display screen, is modulated through a lens to reach an exit pupil, and is incident in the diffractive waveguide 102. The input grating 103 is responsible for receiving an optical signal and transmitting the optical signal to the diffraction grating 104 by performing total reflection. The diffraction grating 104 is used to perform pupil expansion on the received optical signal, transmit the optical signal to the output grating 105 by performing total reflection, output the optical signal through the output grating 105, and project the optical signal to the human eye 106 for imaging.

It should be understood that pupil expansion refers to converting an input optical signal of a low angle of view into an output optical signal of a high angle of view, and includes horizontal pupil expansion and vertical pupil expansion. An angle of view may be measured by using a viewing angle (field of view, FOV). Specifically, the angle of view is an included angle between a display edge and a human eye connection line, and the angle of view may include a horizontal angle of view and a vertical angle of view.

In FIG. 1, the diffraction grating 104 performs pupil expansion on incident light, and can divide the incident light into several diffractive orders of light and perform dispersion. It should be understood that the diffraction grating may include a one-dimensional grating and a two-dimensional grating. To avoid a ghost image and stray light, the diffraction grating generally has only a first-order diffraction order, including a positive first order and a negative first order. For example, a diffraction order of the one-dimensional grating may be +1 or −1; and a diffraction order of the two-dimensional grating may include (−1, 1), (−1, −1), (1, 1), (1, −1), (1, 0), (−1, 0), (0, −1), and (0, 1).

After the diffraction grating 104 divides the incident light into several diffractive orders of light, each diffractive order of light may continue to propagate in different directions within the diffractive waveguide 102. The diffraction grating 104 performs an operation in this dimensional on the incident light mainly to change a propagation direction of the incident light. Specifically, diffraction efficiency of incident light of a diffraction order (namely, a direction) can be optimized to highest efficiency by using parameters such as a material refractive index of the diffraction grating 104, a grating shape of the diffraction grating 104, a thickness of the diffraction grating 104, and a duty ratio of the diffraction grating 104, so that most light mainly propagates along this direction after diffraction, to reduce a loss of light in another diffraction direction.

For a problem of dispersion, the diffraction grating 104 may produce different diffraction angles for different wavelengths of incident light, and when a wavelength of light is longer, a diffraction angle of the light is larger. For example, the incident light includes tricolor light, namely, red light, green light, and blue light. Because a wavelength of the red light>a wavelength of the green light>a wavelength of the blue light, a diffraction angle of the red light>a diffraction angle of the green light>a diffraction angle of the blue light. When a diffraction angle of incident light is different, a path length of the incident light to complete each time of total reflection is also different. Therefore, total reflection times of the red light<total reflection times of the green light<total reflection times of the blue light. Based on the difference, the incident light including tricolor light, namely, the red light, the green light, and the blue light, is finally displayed an image by using the diffractive waveguide 102, and luminance and colors of the image are nonuniform.

Therefore, when different colors of incident light is transmitted in the diffractive waveguide, transmission angles and paths are different, and consequently uniformity of the image is relatively poor, affecting user experience.

In view of this, this application provides an image display method, luminance distribution of a light source in an optical engine is adjusted, to compensate for luminance of an image displayed by a diffractive waveguide, and therefore uniformity of the image displayed by the diffractive waveguide is improved, thereby improving user experience.

It should be understood that the image display method of this embodiment of this application may be applied to an image display device including the optical engine and the diffractive waveguide, for example, an AR helmet, a pair of AR glasses, a mobile phone, a tablet, a computer, a vehicle-mounted head-up display (head-up display, HUD), an AR intelligent interactive device, and a pair of smart glasses. This is not limited in this embodiment of this application.

The following descriptions are made before the image display method and an image display apparatus provided in embodiments of this application are described.

First, in embodiments shown below, terms and English abbreviations such as uniformity data, uniformity sub-data, and compensation data, are examples given for ease of description, and shall not constitute any limitation on this application. This application does not exclude a possibility of defining another term that can implement a same or similar function in an existing or a future protocol.

Second, the terms "first", "second", and various numerical numbers in the following embodiments are merely used for distinguishing for ease of description, and are not intended to limit the scope of embodiments of this application, for example, distinguishing between different images and distinguishing between different regions.

Third, "at least one" indicates one or more, and "a plurality of" indicates two or more. "And/or" describes an association relationship between associated objects, and indicates that three relationships may exist. For example, A and/or B may indicate the following cases: A exists alone, both A and B exist, and B exists alone, where A and B may be singular or plural. The character "/" generally indicates an "or" relationship between the associated objects. "At least one of the following items (pieces)" or a similar expression thereof indicates any combination of these items, including any combination of singular items (pieces) or plural items (pieces). For example, at least one of a, b, and c may indicate a, b, c, a and b, a and c, b and c, or a, b, and c, where a, b, and c may be singular or plural.

The following describes the image display method and the image display apparatus provided in this application in detail with reference to the accompanying drawings.

Figure 2:
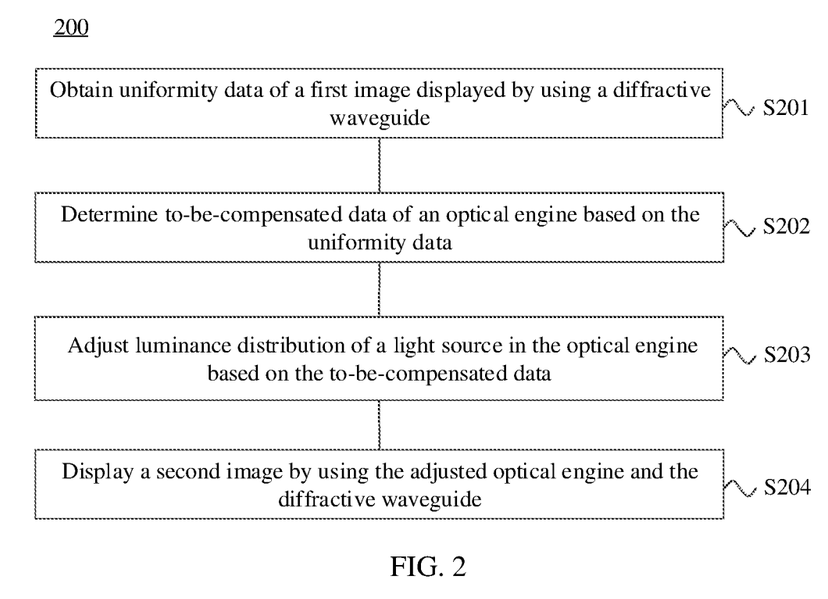
FIG. 2 is a schematic flowchart of an image display method according to an embodiment of this application.

FIG. 2 is a schematic flowchart of an image display method 200 according to an embodiment of this application. The method 200 may be performed by an image display device. The method includes the following steps.

S201: Obtain uniformity data of a first image obtained by using a diffractive waveguide. It should be understood that the first image may be an image output only by using the diffractive waveguide. When different colors of incident light is transmitted in the diffractive waveguide, transmission angles and paths are different, and consequently uniformity of the first image is relatively poor.

S202: Determine to-be-compensated data of an optical engine based on the uniformity data.

S203: Adjust luminance distribution of a light source in the optical engine based on the to-be-compensated data. Because the light source may include an LED array light source, or may include an LD light source, in this embodiment, luminance distribution of the LED array light source may be adjusted, or luminance distribution of the LD light source may be adjusted.

Because the to-be-compensated data is determined based on the uniformity data of the first image, and the uniformity data of the first image reflects a degree of uniformity of the image displayed by the diffractive waveguide, the to-be-compensated data can compensate for the uniformity of the image displayed by the diffractive waveguide.

S204: Display a second image by using the adjusted light source and the diffractive waveguide. It should be understood that the second image is an image displayed after luminance compensation is performed on the diffractive waveguide. Because luminance compensation is performed, uniformity of the second image relative to the first image is higher.

In the image display method in this embodiment of this application, the luminance distribution of the light source in the optical engine is adjusted, to compensate for luminance of the image displayed by the diffractive waveguide, and therefore the uniformity of the image displayed by the diffractive waveguide is improved, thereby improving user experience.

It should be understood that, in this embodiment of this application, image uniformity includes luminance uniformity of an image and color uniformity of an image. Luminance and a color are associated, and the color changes with the luminance. Therefore, in this embodiment of this application, the luminance distribution of the light source in the optical engine is adjusted, to actually adjust luminance uniformity and color uniformity of an image presented by the optical engine, so that uniformity of the image output by the optical engine and uniformity of the image output by the diffractive waveguide are complementary. Finally, a high-uniformity image is presented.

Figure 3:
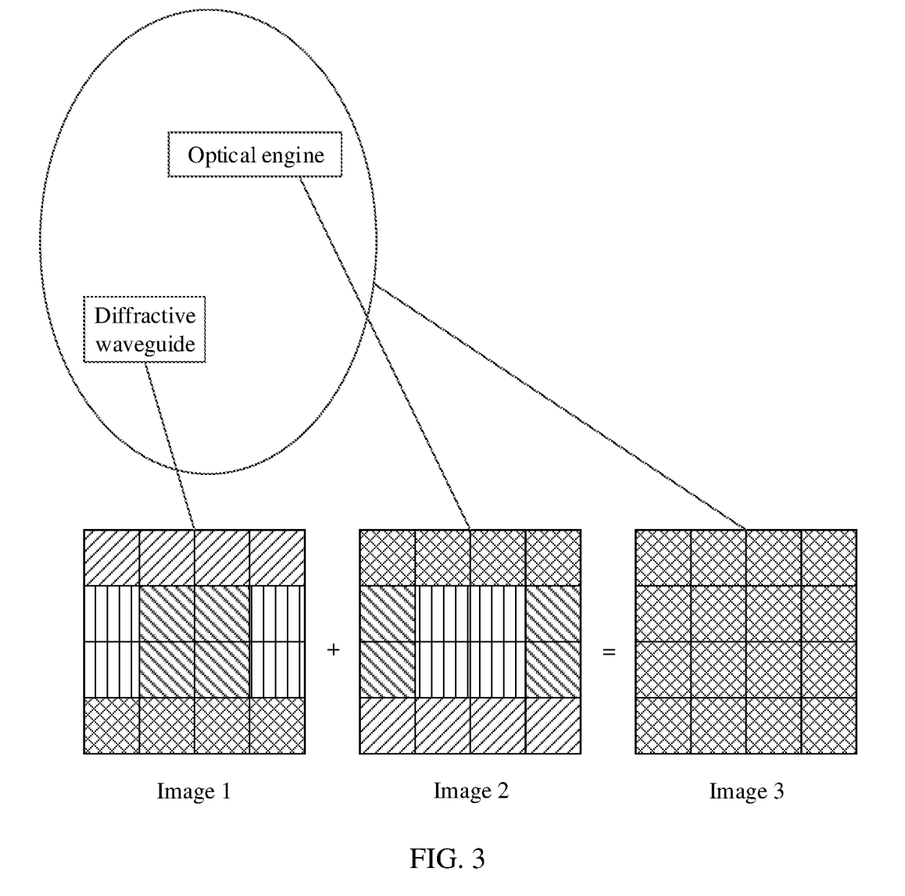
FIG. 3 is a schematic diagram of image uniformity corresponding to an image display method according to an embodiment of this application.

The following describes a principle of the embodiment of this application with reference to FIG. 3.

FIG. 3 is a schematic diagram of image uniformity corresponding to the method 200. An image obtained by the diffractive waveguide is an image 1 (equivalent to the first image), an image imaged by the optical engine is an image 2, and an image displayed by the diffractive waveguide and the optical engine is an image 3 (equivalent to the second image). In FIG. 3, the image 1, the image 2, and the image 3 each are divided into 4×4 regions, and each region has a respective luminance value, to exhibit luminance distribution of the image. A luminance distribution of the image 1, luminance distribution of the image 2, and luminance distribution of the image 3 may be respectively shown by lines in FIG. 3, and different line patterns represent different luminance values. It can be seen from FIG. 3, the luminance distribution of the image 1 is nonuniform, the luminance distribution of the image 2 is nonuniform, and the luminance distribution of the image 3 obtained by superimposing the image 1 and the image 2 is uniform. In this example, the image 1 is divided into 4×4 regions, the image 2 is also divided into 4×4 regions, and the regions of the image 1 and the regions of the image 2 are in a one-to-one correspondence.

In an optional embodiment, the uniformity data of the first image obtained by using the diffractive waveguide may be obtained in a plurality of different manners. In other words, S201 may be implemented in a plurality of different manners. The following describes two possible implementations.

Figure 4:
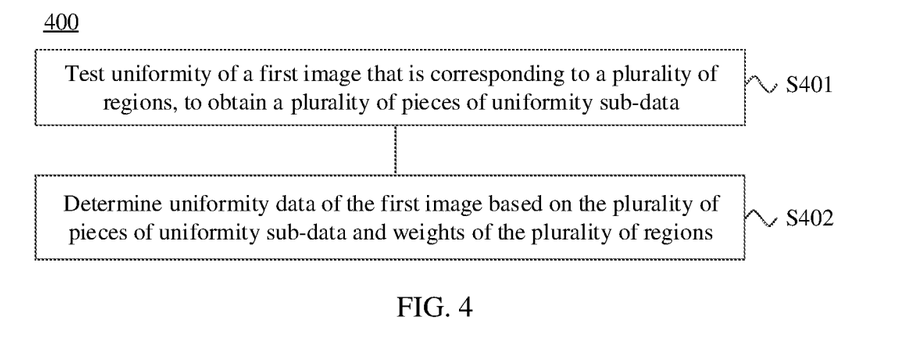
FIG. 4 is a schematic flowchart of another image display method according to an embodiment of this application.

In a first possible implementation, as shown in FIG. 4, S201 may include the following steps:

S401: Test uniformity of the first image that is corresponding to a plurality of regions, to obtain a plurality of pieces of uniformity sub-data.

S402: Determine the uniformity data of the first image based on the plurality of pieces of uniformity sub-data and weights of the plurality of regions.

A human eye can move, a human eye of a same user may be located in different positions of an eye box eye box at different moments, and human eyes of different users may also be located in different positions of the eye box relative to a same device. Therefore, the plurality of regions in this embodiment of this application may include regions obtained by dividing the eye box. In different regions, the human eye may see first images of different uniformity degrees. In this embodiment of this application, uniformity sub-data is used to indicate uniformity degrees of first images in different regions.

In this embodiment of this application, the plurality of regions have respective weights, weights of some regions may be the same, and weights of some regions may be different. This is not limited in this embodiment of this application.

In a possible implementation, considering that a proportion of people corresponding to an intermediate region is relatively high, and a proportion of people corresponding to an edge region is relatively low, an intermediate region of the plurality of regions has a highest weight, and an edge region of the plurality of regions has a lowest weight. In this way, this is more consistent with an actual situation and is beneficial to obtaining more accurate uniformity data.

Figure 5:
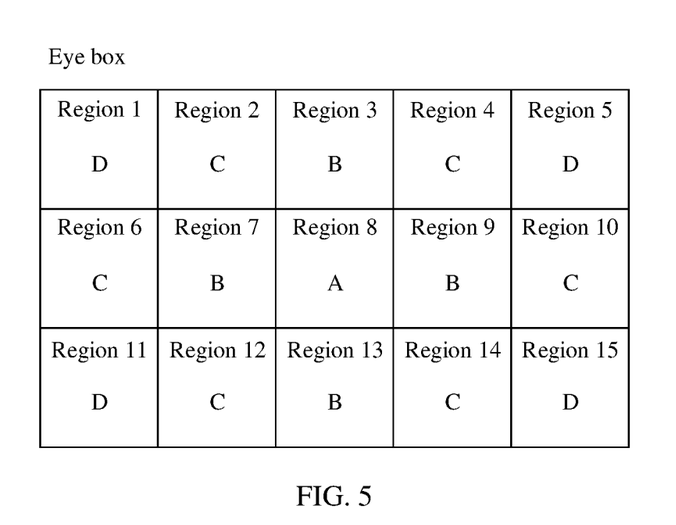
FIG. 5 is a schematic diagram of a weight distribution of a plurality of regions according to an embodiment of this application.

For example, as shown in FIG. 5, the eye box eye box may be divided into 3×5 regions, and the plurality of regions include 15 regions. The 15 regions respectively are a region 1, a region 2, . . . , and a region 15, and the human eye may be located in any one of the 15 regions. The plurality of pieces of uniformity sub-data include 15 pieces of uniformity sub-data corresponding to the 15 regions. A weight of the region 8 is A, weights of a region 3, a region 7, a region 9, and a region 13 are B, weights of the region 2, a region 4, a region 6, a region 10, a region 12, and a region 14 are C, and weights of the region 1, a region 5, a region 11, and the region 15 are D. A to D represent sizes of weights. A indicates a highest weight, B and C indicate secondary highest weights, and D indicates a lowest weight. For example, it may be set that A is 60%, a sum of weights of regions whose weights are B is 30%, namely, B is 7.5%, a sum of weights of regions whose weights are C is 20%, namely, C is 3.3%, and a sum of weights of regions whose weights are D is 10%, namely, D is 2.5%. However, this is not limited in this embodiment of this application.

Optionally, the uniformity data of the first image may be obtained by performing weighted summation on the uniformity sub-data corresponding to the plurality of regions.

In the example, the uniformity data of the first image may be a sum of 10%×uniformity sub-data that corresponds to the region 1, 3.3%×uniformity sub-data that corresponds to the region 2, . . . , and 2.5%×uniformity sub-data that corresponds to the region 15.

In the image display method in this embodiment of this application, through region division, the uniformity data of the first image may be determined based on the uniformity sub-data corresponding to the plurality of divided regions and the weights of the plurality of regions, to determine the to-be-compensated data based on the uniformity data, further the luminance distribution of the light source in the optical engine is adjusted, and the second image is displayed by using the optical engine and the diffractive waveguide. In the method in this embodiment of this application, all regions in which the human eye may be located can be considered, so that uniformity of images displayed in different regions gazed by different users or in different regions gazed by a same user at different moments is improved, thereby improving user experience.

Figure 6:
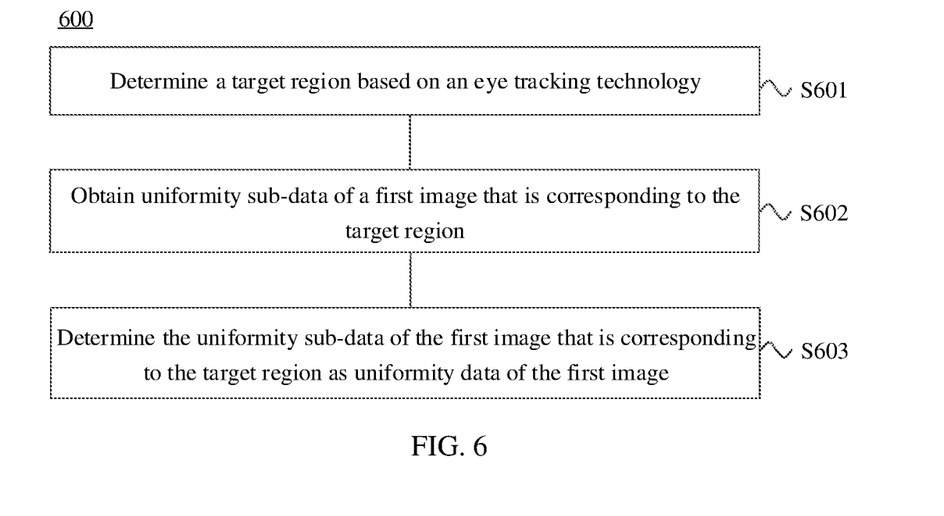
FIG. 6 is a schematic flowchart of still another image display method according to an embodiment of this application.

In a second possible implementation, as shown in FIG. 6, S201 may include the following steps:

S601: Determine a target region based on an eye tracking technology.

S602: Obtain uniformity sub-data of the first image that is corresponding to the target region.

S603: Determine the uniformity sub-data of the first image that is corresponding to the target region as the uniformity data of the first image.

Specifically, the image display device may first determine a relative position of an eyeball pupil based on the eye tracking technology, and further determine a human eye gaze point. A region in which the human eye gaze point is located is the target region. In this embodiment of this application, the uniformity sub-data of the first image that is corresponding to the target region is the uniformity data of the first image.

In the image display method in this embodiment of this application, a human eye position is tracked in real time by using the eye tracking technology, the uniformity data of the first image is obtained based on the human eye position, then the luminance distribution of the light source in the optical engine is adjusted in real time, and the second image is displayed by using the optical engine and the diffractive waveguide. In the method in this embodiment of this application, different users may be flexibly adapted, and uniformity of an image of a target region that is corresponding to an eyeball position of a current user is determined based on the eyeball position of the current user, to perform compensation based on the uniformity of the image of the target region, to provide good experience for the user.

In an optional embodiment, in this embodiment of this application, the uniformity sub-data of the first image that is corresponding to the target region may be obtained in a plurality of different manners. This is not limited in this embodiment of this application.

Manner 1: After the image display device determines the target region by using the eye tracking technology, the image display device can measure the uniformity sub-data of the first image that is corresponding to the target region in real time.

Manner 2: After the image display device determines the target region by using the eye tracking technology, the image display device can select, from a plurality of pieces of uniformity sub-data of the first image that are corresponding to a plurality of regions, the uniformity sub-data of the first image that is corresponding to the target region, and the plurality of regions include the target region.

It should be understood that, before determining the target region, the image display device has performed S401, tested the uniformity of the first image that is corresponding to the plurality of regions, obtained the plurality of pieces of uniformity sub-data, and stored the plurality of pieces of uniformity sub-data. In this case, after the image display device determines the target region, the uniformity sub-data corresponding to the target region may be directly selected from the plurality of pieces of uniformity sub-data corresponding to the plurality of regions.

For example, in FIG. 5, the image display device may determine the target region as the region 7 based on the eye tracking technology, and then the image display device may select, from the 15 pieces of uniformity sub-data corresponding to the 15 regions, uniformity sub-data corresponding to the region 7, and determine the uniformity sub-data corresponding to the region 7 as the uniformity data of the first image.

By comparing the foregoing two possible manners, it can be concluded that in manner 1, image uniformity of a plurality of regions does not need to be measured in advance, and a plurality of pieces of uniformity sub-data do not need to be stored, so that manner 1 is beneficial to reducing energy consumption and saving a memory of the device. However, in manner 2, image uniformity of the target region does not need to be measured after the target region is determined, to shorten an image display delay and improve image display efficiency.

In an optional embodiment, before the determining to-be-compensated data of an optical engine based on the uniformity data, namely, before S202, the method 200 further includes: obtaining a luminance value of an environment in which the image display device is located. The determining to-be-compensated data of an optical engine based on the uniformity data includes: determining the to-be-compensated data based on the uniformity data of the first image and the luminance value.

For example, the image display device may test the luminance value of the current environment by using an ambient light sensor. If the uniformity data of the first image is 20 nits and the luminance value of the environment in which the image display device is located is 100 nits, the to-be-compensated data may be 5, to be specific, 100 divided by 20 equals 5.

In an optional embodiment, the adjusting luminance distribution of a light source in the optical engine based on the to-be-compensated data, namely, S203, includes: determining a target current value based on the to-be-compensated data; and adjusting the luminance distribution of the light source based on the target current value.

It should be understood that, because a larger current value indicates a brighter light source, and a smaller current value indicates a darker light source, in this embodiment of this application, the luminance distribution of the light source in the optical engine can be adjusted based on the target current value determined by the to-be-compensated data.

For example, if the light source is an LED array light source, and different LEDs in the LED array light source have different luminance, the image display device can first determine a relationship between different luminance and current values, then determine luminance required by each LED in the LED array, and convert the luminance required by each LED into a current value required by each LED, namely, the target current value.

Figure 7:
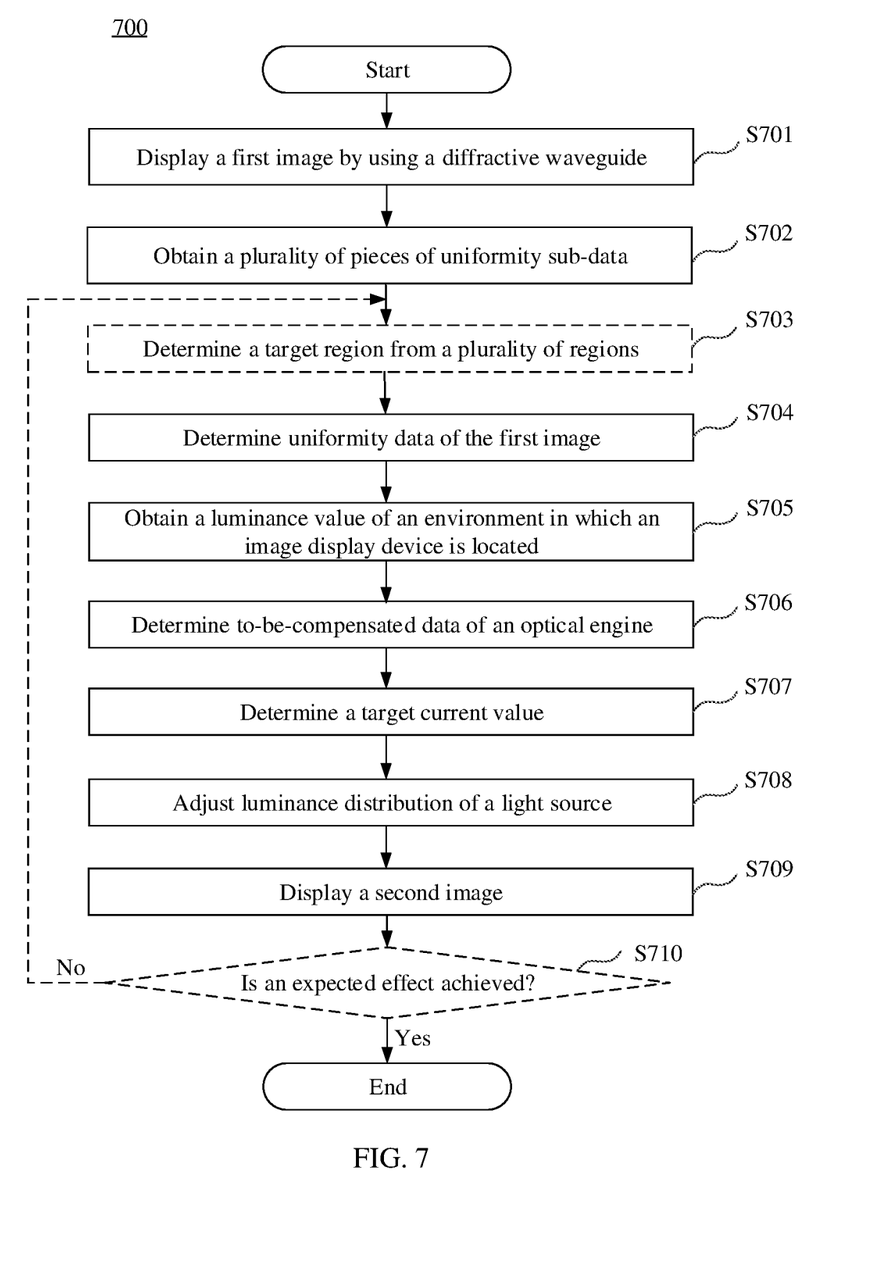
FIG. 7 is a schematic flowchart of another image display method according to an embodiment of this application.

To better understand the image display method provided in this application, the following describes in detail, with reference to FIG. 7, the image display method provided in this embodiment of this application.

FIG. 7 is a schematic flowchart of another image display method 700 according to this application. The method may be performed by an image display device, and may include the following steps:

S701: Obtain a first image by using a diffractive waveguide.

S702: Test uniformity of the first image that is corresponding to a plurality of regions, to obtain a plurality of pieces of uniformity sub-data.

Optionally, S703: Determine a target region from a plurality of regions by using an eye tracking technology.

S704: Determine uniformity data of the first image.

It should be understood that S704 includes two possible implementations.

In a first possible implementation, after performing S703, an image display apparatus may perform S704, that is, the image display device determines the target region, and determines uniformity sub-data of the first image that is corresponding to the target region as the uniformity data of the first image.

In a second possible implementation, an image display apparatus may not perform S703, but directly perform S704 after performing S702, that is, the image display device may determine the uniformity data of the first image based on uniformity sub-data of the first image that is corresponding to a plurality of regions and weights of the plurality of regions.

S705: Obtain a luminance value of an environment in which the image display device is located.

S706: Determine to-be-compensated data of an optical engine based on the uniformity data of the first image and the obtained luminance value.

S707: Determine a target current value based on the to-be-compensated data of the optical engine.

S708: Adjust luminance distribution of a light source in the optical engine based on the target current value.

S709: Display a second image by using the adjusted optical engine and the diffractive waveguide.

Optionally, in the first possible implementation, that is, the uniformity data of the first image is the uniformity data of the first image that is corresponding to the target region determined by the image display apparatus by using the eye tracking technology, the method 700 may further include:

S710. Determine whether the second image achieves an expected effect.

Specifically, the image display apparatus may test uniformity of the second image, to obtain uniformity data of the second image, and further determine, based on the uniformity data of the second image and the luminance value of the environment in which the image display device is located, whether the uniformity of the second image can achieve the expected effect. If the uniformity of the second image achieves the expected effect, this procedure ends and the second image is output for a user; and if the uniformity of the second image does not achieve the expected effect, S703 to S710 are repeatedly performed until the expected effect is achieved.

It should be understood that S701, S702, and S704 to S709 form an image display method. In the method, through region division, the uniformity data of the first image may be determined based on uniformity sub-data corresponding to a plurality of divided regions and weights of the plurality of regions, to determine the to-be-compensated data based on the uniformity data, further the luminance distribution of the light source in the optical engine is adjusted, and the second image is displayed by using the optical engine and the diffractive waveguide. In the method, all regions in which a human eye may be located can be considered, so that uniformity of images displayed in different regions gazed by different users or in different regions gazed by a same user at different moments is improved, thereby improving user experience.

S701 to S710 form another image display method. In the method, a human eye position is tracked in real time by using the eye tracking technology, the uniformity data of the first image is obtained based on the human eye position, then the luminance distribution of the light source in the optical engine is adjusted in real time, the second image is displayed by using the optical engine and the diffractive waveguide, whether the uniformity of the second image achieves an expected effect is detected, and if the expected effect is not achieved, the method is repeatedly performed until the expected effect is achieved. In the method, different users may be flexibly adapted, and uniformity of an image of a target region that is corresponding to an eyeball position of a current user is determined based on the eyeball position of the current user, to perform compensation based on the uniformity of the image of the target region, to provide good experience for the user.

It should be understood that sequence numbers of the foregoing processes do not indicate execution sequences. The execution sequences of the processes should be determined based on functions and internal logic of the processes, and should not be construed as any limitation on the implementation processes of embodiments of this application.

The foregoing describes the image display method according to embodiments of this application in detail with reference to FIG. 2 to FIG. 7. The following describes an image display apparatus according to embodiments of this application in detail with reference to FIG. 8 to FIG. 10.

Figure 8:
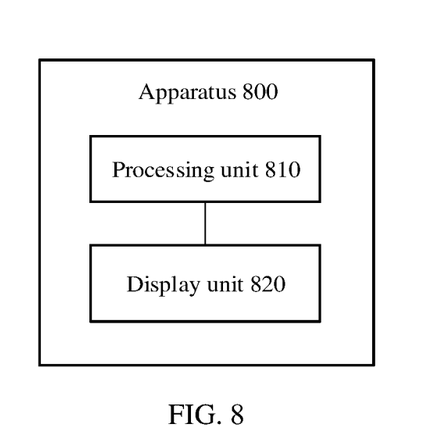
FIG. 8 is a schematic block diagram of an image display apparatus according to an embodiment of this application.

FIG. 8 shows an image display apparatus 800 according to an embodiment of this application. The apparatus 800 includes a processing unit 810 and a display unit 820. The display unit 820 includes an optical engine and a diffractive waveguide.

The processing unit 810 is configured to: obtain uniformity data of a first image obtained based on the optical engine and the diffractive waveguide, determine to-be-compensated data of the optical engine based on the uniformity data, and adjust luminance distribution of a light source in the optical engine based on the to-be-compensated data. The display unit 820 is configured to display a second image based on the adjusted light source and the diffractive waveguide.

Optionally, the processing unit 820 is specifically configured to: test uniformity of the first image that is corresponding to a plurality of regions, to obtain a plurality of pieces of uniformity sub-data; and determine the uniformity data based on the plurality of pieces of uniformity sub-data and weights of the plurality of regions.

Optionally, the processing unit 820 is further configured to: determine a target region based on an eye tracking technology; obtain uniformity sub-data of the first image that is corresponding to the target region; and determine the uniformity sub-data of the first image that is corresponding to the target region as the uniformity data.

Optionally, the processing unit 820 is specifically configured to select, from a plurality of pieces of uniformity sub-data of the first image that are corresponding to a plurality of regions, the uniformity sub-data of the first image that is corresponding to the target region, where the plurality of regions include the target region.

Optionally, the processing unit 820 is further configured to obtain a luminance value of an environment in which the apparatus is located; and determine the to-be-compensated data based on the uniformity data and the luminance value.

Optionally, the processing unit 820 is specifically configured to: determine a target current value based on the to-be-compensated data; and adjust the luminance distribution of the light source based on the target current value.

It should be understood that the apparatus 800 herein is represented in a form of a functional module. The term "unit" herein may be an application-specific integrated circuit (application-specific integrated circuit, ASIC), an electronic circuit, a processor (for example, a shared processor, a dedicated processor, or a group processor) configured to execute one or more software or firmware programs and a memory, a merged logic circuit, and/or another appropriate component that supports the described functions. In an optional example, a person skilled in the art may understand that the apparatus 800 may be specifically the image display device in the embodiment, or functions of the image display device in the embodiment may be integrated into the apparatus 800. The apparatus 800 may be configured to perform each procedure and/or step corresponding to the image display device in the method embodiments. To avoid repetition, details are not described herein again.

The apparatus 800 has functions for implementing corresponding steps performed by the image display device in the foregoing method. The functions may be implemented by hardware, or may be implemented by hardware executing corresponding software. The hardware or the software includes one or more modules corresponding to the functions.

In this embodiment of this application, the apparatus 800 in FIG. 8 may alternatively be a chip or a chip system, for example, a system on chip (system on chip, SoC).

Figure 9:
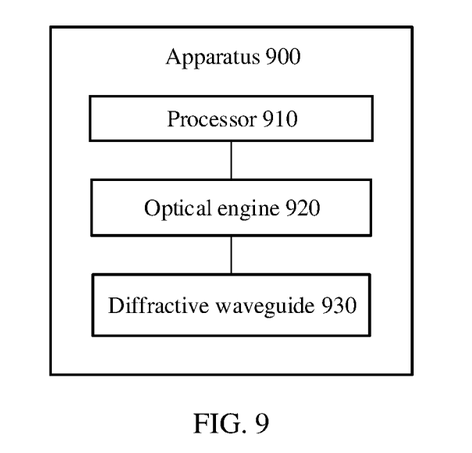
FIG. 9 is a schematic block diagram of another image display apparatus according to an embodiment of this application.

FIG. 9 shows another image display apparatus 900 according to an embodiment of this application. The apparatus 900 includes a processor 910, an optical engine 920, and a diffractive waveguide 930. The processor 910 is configured to: obtain uniformity data of a first image obtained based on the optical engine 920 and the diffractive waveguide 930, determine to-be-compensated data of the optical engine 920 based on the uniformity data, and adjust luminance distribution of a light source in the optical engine 920 based on the to-be-compensated data; and the optical engine 920 and the diffractive waveguide 930 are configured to display a second image based on the adjusted light source.

It should be understood that the apparatus 900 may be specifically the image display device in the foregoing embodiment, or functions of the image display device in the foregoing embodiment may be integrated into the apparatus 900, and the apparatus 900 may be configured to perform each step and/or procedure corresponding to the image display device in the foregoing method embodiment.

Figure 10:
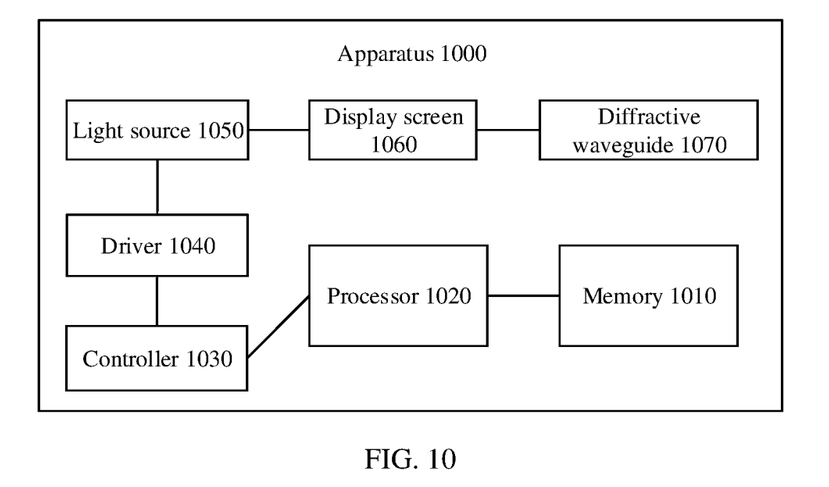
FIG. 10 is a schematic block diagram of still another image display apparatus according to an embodiment of this application.

Further, the optical engine may include a light source and a display screen. FIG. 10 shows still another image display apparatus 1000 according to an embodiment of this application. The apparatus 1000 includes a memory 1010, a processor 1020, a controller 1030, a driver 1040, a light source 1050, a display screen 1060, and a diffractive waveguide 1070.

The components may be connected through an internal path. The memory 1010 is configured to store data (for example, the uniformity data of the first image) and an instruction. The processor 1020 is configured to execute the instruction stored in the memory 1010 to perform a preprocessing operation, that is, determine to-be-compensated data of the light source 1050 based on the uniformity data of the first image, to control the driver 1040 by using the controller 1030, to adjust luminance distribution of the light source 1050. Light emitted from the adjusted light source 1050 may be transmitted to the display screen 1060 for imaging, and then incident in a human eye by using the diffractive waveguide 1070. In this embodiment, the image that can be seen by a user is a second image displayed by the adjusted light source and the diffractive waveguide. For related details, refer to descriptions of the foregoing method embodiment, and details are not described herein again.

It should be understood that the apparatus 1000 may be specifically the image display device in the foregoing embodiment, or functions of the image display device in the foregoing embodiment may be integrated into the apparatus 1000, and the apparatus 1000 may be configured to perform each step and/or procedure corresponding to the image display device in the foregoing method embodiment.

Optionally, the memory may include a read-only memory and a random access memory, and provide instructions and data for the processor. A part of the memory may further include a non-volatile random access memory. For example, the memory may further store information about a type of a storage device. The processor may be configured to execute the instructions stored in the memory, and when the processor executes the instructions, the processor may perform steps and/or procedures that are in the foregoing method embodiments and that correspond to the image display apparatus and that are in the foregoing method embodiments.

It should be understood that in embodiments of this application, the processor may be a central processing unit (central processing unit, CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like. The controller may be a micro control unit (microcontroller unit, MCU).

In an implementation process, steps in the foregoing method may be implemented by using a hardware integrated logic circuit in the processor or by using instructions in a form of software. The steps of the methods disclosed with reference to embodiments of this application may be directly performed and completed by a hardware processor, or may be performed and completed by using a combination of hardware and software modules in the processor. The software module may be located in a mature storage medium in this field, for example, a random access memory, a flash memory, a read-only memory, a programmable read-only memory, an electrically erasable programmable memory, or a register. The storage medium is located in the memory, and the processor executes the instructions in the memory and completes the steps of the foregoing method in combination with the hardware of the processor. To avoid repetition, details are not described herein again.

A person of ordinary skill in the art may be aware that units and algorithm steps in the examples described with reference to embodiments disclosed in this specification may be implemented by electronic hardware or a combination of computer software and electronic hardware. Whether these functions are performed by hardware or software depends on specific applications and design constraints of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for a specific working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in embodiments of this application may be integrated into one processing unit, or each unit may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device, or the like) to perform all or some of the steps of the methods described in embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image display method, applied to an apparatus comprising an optical engine and a diffractive waveguide that provides images viewable via an eye box, the method comprising: obtaining uniformity data of a first image obtained by using the diffractive waveguide, including: testing uniformity of the first image that is corresponding to a plurality of regions of the eye box, to obtain a plurality of pieces of uniformity sub-data, and determining the uniformity data based on the plurality of pieces of uniformity sub-data and weights of the plurality of regions; determining to-be-compensated data of the optical engine based on the obtained uniformity data of the first image; adjusting luminance distribution of a light source in the optical engine based on the determined to-be-compensated data; and displaying a second image by using the adjusted optical engine and the diffractive waveguide.

2. An image display method, applied to an apparatus comprising an optical engine and a diffractive waveguide that provides images viewable via an eye box, the method comprising: determining a target region within the eye box based on an eye tracking technology; then obtaining uniformity data of a first image displayed by using the diffractive waveguide, comprising: obtaining uniformity sub-data of the first image that is corresponding to the determined target region, and determining the uniformity sub-data of the first image that is corresponding to the target region as the uniformity data; determining to-be-compensated data of the optical engine based on the obtained uniformity data of the first image; adjusting luminance distribution of a light source in the optical engine based on the determined to-be-compensated data; and displaying a second image by using the adjusted optical engine and the diffractive waveguide.

3. The method according to claim 2, wherein the obtaining uniformity sub-data of the first image that is corresponding to the target region comprises:

selecting, from a plurality of pieces of uniformity sub-data of the first image that are corresponding to a plurality of regions, the uniformity sub-data of the first image that is corresponding to the target region, wherein the plurality of regions comprise the target region.

4. The method according to claim 1, wherein before the determining to-be-compensated data of the optical engine based on the uniformity data, the method further comprises:

obtaining a luminance value of an environment in which the apparatus is located; and the determining to-be-compensated data of the optical engine based on the uniformity data comprises:

determining the to-be-compensated data based on the uniformity data and the luminance value.

5. The method according to claim 1, wherein the adjusting luminance distribution of a light source in the optical engine based on the to-be-compensated data comprises:

determining a target current value based on the to-be-compensated data; and adjusting the luminance distribution of the light source based on the target current value.

6. An image display apparatus, comprising: a processor, an optical engine and a diffractive waveguide, the optical engine and diffractive waveguide providing images viewable via an eye box, wherein the processor is configured to perform operations comprising: obtain uniformity data of a first image obtained based on the optical engine and the diffractive waveguide, including testing uniformity of the first image that is corresponding to a plurality of regions of the eye box, to obtain a plurality of pieces of uniformity sub-data, and determining the uniformity data based on the plurality of pieces of uniformity sub-data and weights of the plurality of regions, determine to-be-compensated data of the optical engine based on the uniformity data, and adjust luminance distribution of a light source in the optical engine based on the to-be-compensated data; and the optical engine and the diffractive waveguide are configured to display a second image based on the adjusted light source.

7. An image display apparatus comprising: a processor, an optical engine, and a diffractive waveguide providing images viewable via an eye box; wherein the processor is configured to perform operations comprising: determine a target region within the eye box based on an eye tracking technology; obtain uniformity data of a first image obtained based on the optical engine and the diffractive waveguide, including obtain uniformity sub-data of the first image that is corresponding to the target region, and determine the uniformity sub-data of the first image that is corresponding to the target region as the uniformity data; determine to-be-compensated data of the optical engine based on the uniformity data, and adjust luminance distribution of a light source in the optical engine based on the to-be-compensated data, wherein the optical engine and the diffractive waveguide are configured to display a second image based on the adjusted light source.

8. The apparatus according to claim 7, wherein the processor is further specifically configured to:

select, from a plurality of pieces of uniformity sub-data of the first image that are corresponding to a plurality of regions, the uniformity sub-data of the first image that is corresponding to the target region, wherein the plurality of regions comprise the target region.

9. The apparatus according to claim 6, wherein the processor is configured to:

obtain a luminance value of an environment in which the apparatus is located; and determine the to-be-compensated data based on the uniformity data and the luminance value.

10. The apparatus according to claim 6, wherein the processor is specifically configured to:

determine a target current value based on the to-be-compensated data, and adjust the luminance distribution of the light source based on the target current value.

11. An image display apparatus, comprising a processor, wherein the processor is coupled to a memory, the memory is configured to store a computer program, and when the processor invokes the computer program, the apparatus is enabled to perform the method according to claim 1.

12. A computer readable storage medium, configured to store a computer program, wherein the computer program comprises instructions used to perform the method according to claim 1.

13. A computer program product, wherein the computer program product comprises computer program code; and when the computer program code is run on a computer, the computer is enabled to implement the method according to claim 1.

* * * * *